US012672192B2

(12) United States Patent
Jung et al.

(10) Patent No.: US 12,672,192 B2
(45) Date of Patent: Jun. 30, 2026

(54) METHOD AND APPARATUS FOR REPORTING UPLINK Tx DIRECT CURRENT LOCATION BY CONSIDERING INTRA-BAND UL CA IN NEXT-GENERATION MOBILE COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 18/031,490

(22) PCT Filed: Oct. 20, 2021

(86) PCT No.: PCT/KR2021/014643
§ 371 (c)(1),
(2) Date: Apr. 12, 2023

(87) PCT Pub. No.: WO2022/086150
PCT Pub. Date: Apr. 28, 2022

(65) Prior Publication Data
US 2023/0379998 A1 Nov. 23, 2023

(30) Foreign Application Priority Data

Oct. 20, 2020 (KR) ........................ 10-2020-0136074
Jan. 12, 2021 (KR) ........................ 10-2021-0004125
Jan. 13, 2021 (KR) ........................ 10-2021-0004911

(51) Int. Cl.
*H04W 76/20* (2018.01)
*H04W 76/19* (2018.01)

(52) U.S. Cl.
CPC ........... *H04W 76/20* (2018.02); *H04W 76/19* (2018.02)

(58) Field of Classification Search
CPC ....... H04W 76/20; H04W 76/19; H04W 8/24; H04W 72/21; H04L 5/001
See application file for complete search history.

(56) References Cited

U.S. PATENT DOCUMENTS

| | | | |
|---|---|---|---|
| 2019/0182000 A1 | 6/2019 | Futaki | |
| 2019/0313394 A1* | 10/2019 | Kubota | ................... H04L 5/001 |
| 2021/0045017 A1* | 2/2021 | Takeda | ................... H04W 76/27 |
| 2022/0070891 A1* | 3/2022 | Nam | ................... H04L 27/2602 |
| 2023/0026297 A1 | 1/2023 | Kim et al. | |

FOREIGN PATENT DOCUMENTS

KR 10-2021-0077347 A 6/2021

OTHER PUBLICATIONS

European Search Report dated Jan. 30, 2024, issued in European Application No. 21883219.4.
(Continued)

*Primary Examiner* — Marcus Smith
*Assistant Examiner* — Raenita Ann Fenner
(74) *Attorney, Agent, or Firm* — Jefferson IP Law, LLP

(57) ABSTRACT
The present disclosure relates to a communication technique for merging an IoT technology with a 5G communication system for supporting a higher data transmission rate than a 4G system and a system therefor. The present disclosure can be applied to intelligent services (for example, smart homes, smart buildings, smart cities, smart cars or connected cars, healthcare, digital education, retail businesses, security- and safety-related services, and the like) on the basis of a 5G communication technology and an IoT-related technology. The present disclosure proposes a method and apparatus for reporting a UL Tx direct current location by considering intra-band uplink (UL) carrier aggregation (CA) in a wireless communication system.

12 Claims, 9 Drawing Sheets

(56) References Cited

OTHER PUBLICATIONS

Huawei et al., On intra-band CA DC location, R4-2011472, 3GPP TSG-RAN4 WG4 Meeting # 96-e, Electronic Meeting, Aug. 7, 2020.

Huawei et al., On intra-band CA UE capability, R4-2011473, 3GPP TSG-RAN4 WG4 Meeting # 96-e, Electronic Meeting, Aug. 7, 2020.

Huawei et al., On DC location reporting for intra-band UL CA, RP-201746, 3GPP TSG-RAN meeting #89-e, Electronic Meeting, Sep. 7, 2020.

Email Discussion Moderator (Huawei), Moderator's summary for email discussion [89E][08][DC_location reporting_UL-CA] Initial round, RP-202018, 3GPP TSG-RAN Meeting #89-e, Electronic Meeting, Sep. 16, 2020.

3GPP; 3rd Generation Partnership Project; Technical Specification Group Radio Access Network; 5GS; User Equipment (UE) conformance specification; Part 1: Protocol (Release 15); 3GPP TS 38.523-1; V15.1.0; (Sep. 2018); Valbonne, France; Sep. 21, 2018.

Qualcomm Incorporated; TxDC location signalling for EN-DC; 3GPP TSG-RAN WG2 Meeting #AH1807; R2-1810896; Montreal, Canada; Jul. 2-6, 2018; Jul. 8, 2018.

Chinese Office Action with English translation dated Nov. 28, 2025; Chinese Appln. No. 202180071957.3.

Korean Office Action with English translation dated Jan. 21, 2026; Korean Appln. No. 10-2021-0004911.

* cited by examiner

FIG. 9

METHOD AND APPARATUS FOR REPORTING UPLINK Tx DIRECT CURRENT LOCATION BY CONSIDERING INTRA-BAND UL CA IN NEXT-GENERATION MOBILE COMMUNICATION SYSTEM

TECHNICAL FIELD

The disclosure relates to a method and an apparatus for reporting a UL Tx direct current location in consideration of intra-band uplink (UL) carrier aggregation (CA) in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "beyond 4G Network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

Meanwhile, as an example for increasing efficiency of communication between a BS and a UE in a next-generation wireless communication system, research to acquire large throughput in a wider frequency bandwidth through carrier aggregation (CA) is being actively conducted.

DISCLOSURE OF INVENTION

Technical Problem

When the UE does not additionally report the Tx direct current location considering intra-band UL CA to the BS, the BS has difficulty in accurately offsetting carrier leakage for an uplink modulated signal transmitted by the UE applying intra-band UL CA, resulting in low demodulation performance. Accordingly, the disclosure proposes a method and an apparatus for solving the problem.

Solution to Problem

In accordance with an embodiment of the disclosure to solve the problem, a method performed by a user equipment (UE) in a wireless communication system includes an operation of, in case that intra-band uplink carrier aggregation (CA) is configured for the UE, transmitting a UE capability indicating whether the UE is capable of reporting an uplink Tx direct current location for the intra-band uplink CA, to a base station (BS), an operation of receiving a first radio resource control (RRC) message including information on the report of the uplink Tx direct current location for the intra-band uplink CA from the BS, and an operation of transmitting a second RRC message including a list of uplink Tx direct current location information for two carrier combinations related to the intra-band uplink CA to the BS, based on the information on the report.

According to an embodiment of the disclosure, in the method, the uplink Tx direct current location information included in the list may include carrier information on each carrier included in the two carrier combinations and a Tx direct current location value for a reference serving cell index, and the carrier information may include a serving cell index and a BWP identifier.

According to an embodiment of the disclosure, the first RRC message may be an RRC reconfiguration message or an RRC resume message, and wherein the second RRC message may be an RRC reconfiguration complete message or an RRC resume complete message.

According to an embodiment of the disclosure, first information may be configured in master cell group information or secondary cell group information included in the first RRC message.

In accordance with another embodiment of the disclosure, a method performed by a base station (BS) in a wireless communication system includes an operation of, in case that intra-band uplink carrier aggregation (CA) is configured for a user equipment (UE), receiving a UE capability indicating whether the UE is capable of reporting an uplink Tx direct current location for the intra-band uplink CA, from the UE, an operation of transmitting a first radio resource control (RRC) message including information on the report of the uplink Tx direct current location for the intra-band uplink CA to the UE, and an operation of receiving a second RRC message including a list of uplink Tx direct current location information for two carrier combinations related to the intra-band uplink CA from the UE, based on the information on the report.

In accordance with another embodiment of the disclosure, a user equipment (UE) in a wireless communication system includes a transceiver configured to transmit and receive a signal, and a controller connected to the transceiver, wherein the controller is configured to, in case that intra-band uplink carrier aggregation (CA) is configured for the UE, transmit a UE capability indicating whether the UE is capable of reporting an uplink Tx direct current location for the intra-band uplink CA, to a base station (BS), receive a first radio resource control (RRC) message including information on the report of the uplink Tx direct current location for the intra-band uplink CA from the BS, and transmit a second RRC message including a list of uplink Tx direct current location information for two carrier combinations related to the intra-band uplink CA to the BS, based on the information on the report.

In accordance with another embodiment of the disclosure, a base station (BS) in a wireless communication system includes a transceiver configured to transmit and receive a signal, and a controller connected to the transceiver, wherein the controller is configured to, in case that intra-band uplink carrier aggregation (CA) is configured for a user equipment (UE), receive a UE capability indicating whether the UE is capable of reporting an uplink Tx direct current location for the intra-band uplink CA, from the UE, transmit a first radio resource control (RRC) message including information on the report of the uplink Tx direct current location for the intra-band uplink CA to the UE, and receive a second RRC message including a list of uplink Tx direct current location information for two carrier combinations related to the intra-band uplink CA from the UE, based on the information on the report.

Advantageous Effects of Invention

According to an embodiment of the disclosure, it is possible to improve the demodulation performance by reporting a Tx direct current location considering intra-band UL CA to the BS.

Further, according to an embodiment of the disclosure, it is possible to report txDirectCurrentLocation with signaling overhead smaller than the previous signaling overhead.

BRIEF DESCRIPTION OF DRAWINGS

FIG. 9 is a block diagram illustrating a configuration of an LTE eNB or an NR gNB according to an embodiment of the disclosure.

MODE FOR THE INVENTION

Figure 1:
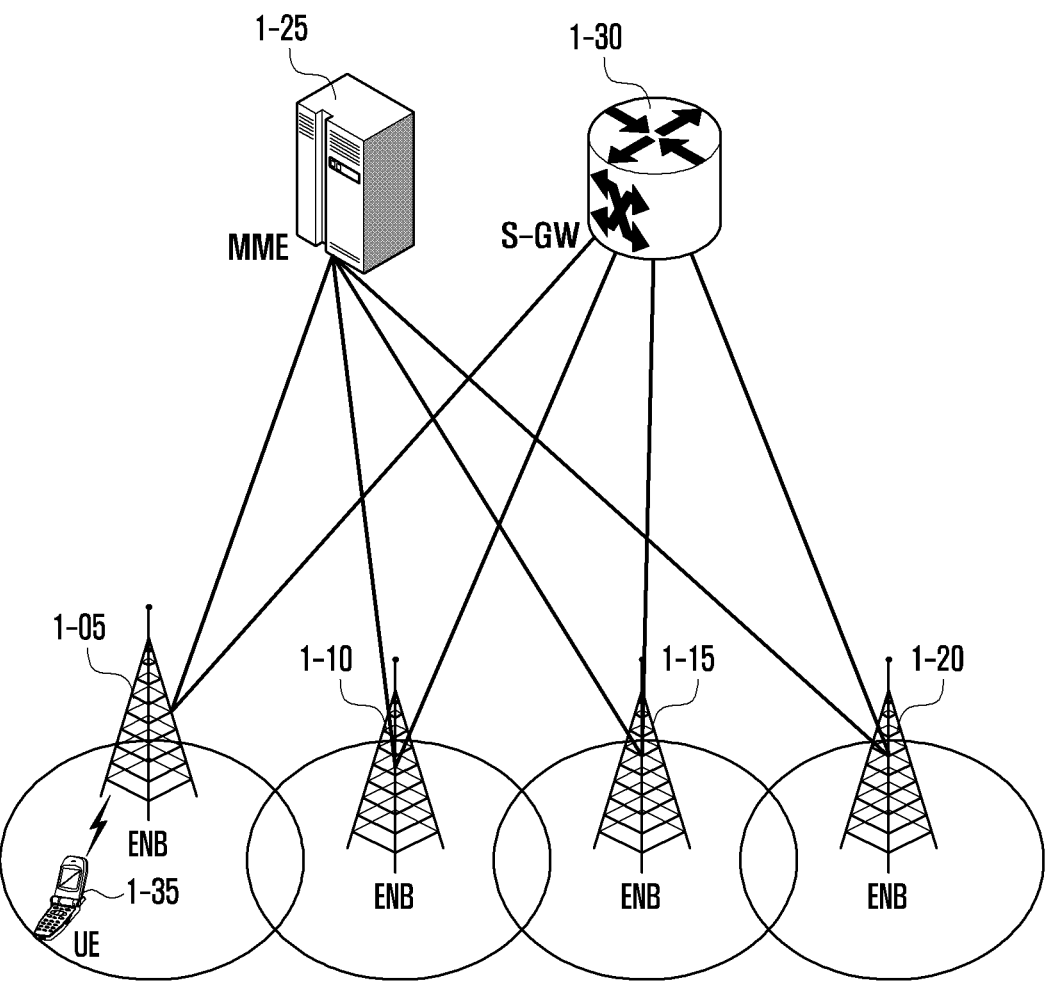
FIG. 1 illustrates a structure of an LTE system according to an embodiment of the disclosure.

Hereinafter, embodiments of the disclosure will be described in detail with reference to the accompanying drawings. In describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Hereinafter, embodiments of the disclosure will be described in detail with reference to the accompanying drawings. In describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) and new radio (NR) standards for the convenience of description. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

FIG. 1 illustrates a structure of an LTE system according to an embodiment of the disclosure.

Referring to FIG. 1, a radio access network of the LTE system includes next-generation base stations (Evolved Node Bs (ENBs), Node Bs, or base stations) 1-05, 1-10, 1-15, and 1-20, a mobility management entity (MME) 1-25, and a serving gateway (S-GW) 1-30. A user terminal (user equipment) (hereinafter, referred to as a UE or a terminal) 1-35 accesses an external network through the ENBs 1-05 to 1-20 and the S-GW 1-30.

In FIG. 1, the ENBs 1-05 to 1-20 correspond to the conventional node B of the UMTS system. The ENB is connected to the UE 1-35 through a radio channel, and performs a more complicated role than that of the conventional node B. In the LTE system, since all user traffic including a real-time service such as Voice over IP (VoIP) via an Internet protocol are served through a shared channel, an apparatus for collecting and scheduling status information such as buffer statuses of UEs, available transmission power status, and channel statuses is required, and the ENBs 1-05 to 1-20 may serve as this apparatus. One ENB generally controls a plurality of cells. For, example, in order to implement a transmission rate of 100 Mbps, the LTE system uses an Orthogonal Frequency Division Multiplexing (OFDM) as a radio access technology in a bandwidth of 20 MHz. Further, an adaptive modulation and coding (AMC) scheme of determining a modulation scheme and a channel coding rate is applied depending on the channel status of the UE. The S-GW 1-30 is a device for providing a data bearer, and generates or removes the data bearer according to the control of the MME 1-25. The MME is a device for performing not only a function of managing mobility of the UE but also various control functions and is connected to a plurality of eNBs.

Figure 2:
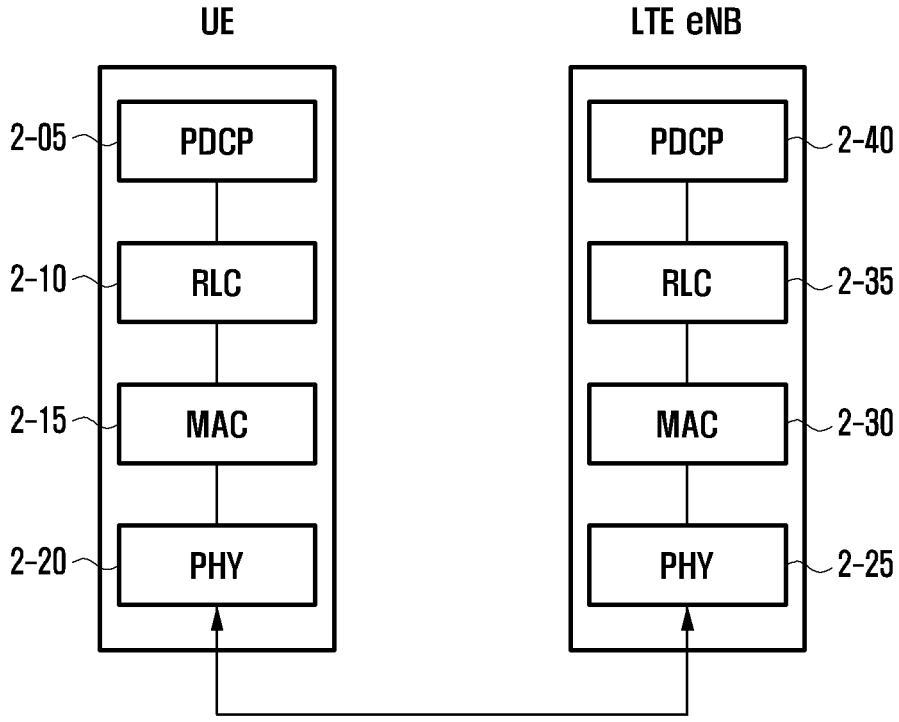
FIG. 2 illustrates a wireless protocol structure in the LTE system according to an embodiment of the disclosure.

FIG. 2 illustrates a wireless protocol structure in the LTE system according to an embodiment of the disclosure.

Referring to FIG. 2, the UE and the ENB include packet data convergence protocols (PDCPs) 2-05 and 2-40, radio link controls (RLCs) 2-10 and 2-35, medium access controls (MACs) 2-15 and 2-30, respectively, in the wireless protocol of the LTE system. The packet data convergence protocols (PDCPs) 2-05 and 2-40 perform an operation of compressing/reconstructing an IP header. Main functions of the PDCP are described below.

- Header compression and decompression function ((Header compression and decompression: robust header compression (ROHC) only)
- User data transmission function (Transfer of user data)
- Sequential delivery function (in-sequence delivery of upper layer packet data units (PDUs) at PDCP reestablishment procedure for RLC acknowledge mode (AM))
- Reordering function (For split bearers in DC (only support for RLC AM): PDCP PDU routing for transmission and PDCP PDU reordering for reception)
- Duplicate detection function (duplicate detection of lower layer Service Data Units (SDUs) at PDCP re-establishment procedure for RLC AM)
- Retransmission function (Retransmission of PDCP SDUs at handover and, for split bearers in DC, of PDCP PDUs at PDCP data-recovery procedure, for RLC AM)
- Ciphering and deciphering function (Ciphering and deciphering)
- Timer-based SDU removal function (Timer-based SDU discard in uplink)
- Radio link control (RLC) 2-10 and 2-35 reconfigure the PDCP packet data unit (PDU) to be the proper size and performs an automatic repeat request (ARQ) operation. Main functions of the RLC are described below.
- Data transmission function (Transfer of upper layer PDUs)
- ARQ function (Error Correction through ARQ (only for AM data transfer))

Concatenation, segmentation, and reassembly function (concatenation, segmentation, and reassembly of RLC SDUs (only for unacknowledged mode (UM) and AM data transfer))

Re-segmentation function (Re-segmentation of RLC data PDUs (only for AM data transfer))

Reordering function (Reordering of RLC data PDUs (only for UM and AM data transfer)

Duplication detection function (only for UM and AM data transfer))

Error detection function (Protocol error detection (only for AM data transfer))

RLC SDU deletion function (RLC SDU discard (only for UM and AM data transfer))

RLC re-establishment function (RLC re-establishment)

The MACs 2-15 and 2-30 are connected with various RLC layer devices included in one UE, and perform an operation for multiplexing RLC PDUs to the MAC PDU and demultiplexing the RLC PDUs from the MAC PDU. Main functions of the MAC are described below.

Mapping function (Mapping between logical channels and transport channels)

Multiplexing and demultiplexing function (Multiplexing/demultiplexing of MAC SDUs belonging to one or different logical channels into/from Transport Blocks (TB) delivered to/from the physical layer on transport channels)

Scheduling information report function (Scheduling information reporting)

Hybrid automatic repeat request (HARQ) function (error correction through HARQ)

Logical channel priority control function (Priority handling between logical channels of one UE)

UE priority control function (Priority handling between UEs by means of dynamic scheduling)

Multimedia Broadcast Multicast Service (MBMS) service identification function (MBMS service identification)

Transport format selection function (Transport format selection)

Padding function (Padding)

The physical layers 2-20 and 2-25 perform an operation for channel-coding and modulating higher-layer data to generate an OFDM symbol and transmitting the OFDM symbol through a radio channel or demodulating and channel-decoding the OFDM symbol received through a radio channel and transmitting the demodulated and channel-decoded OFDM symbol to a higher layer.

Figure 3:
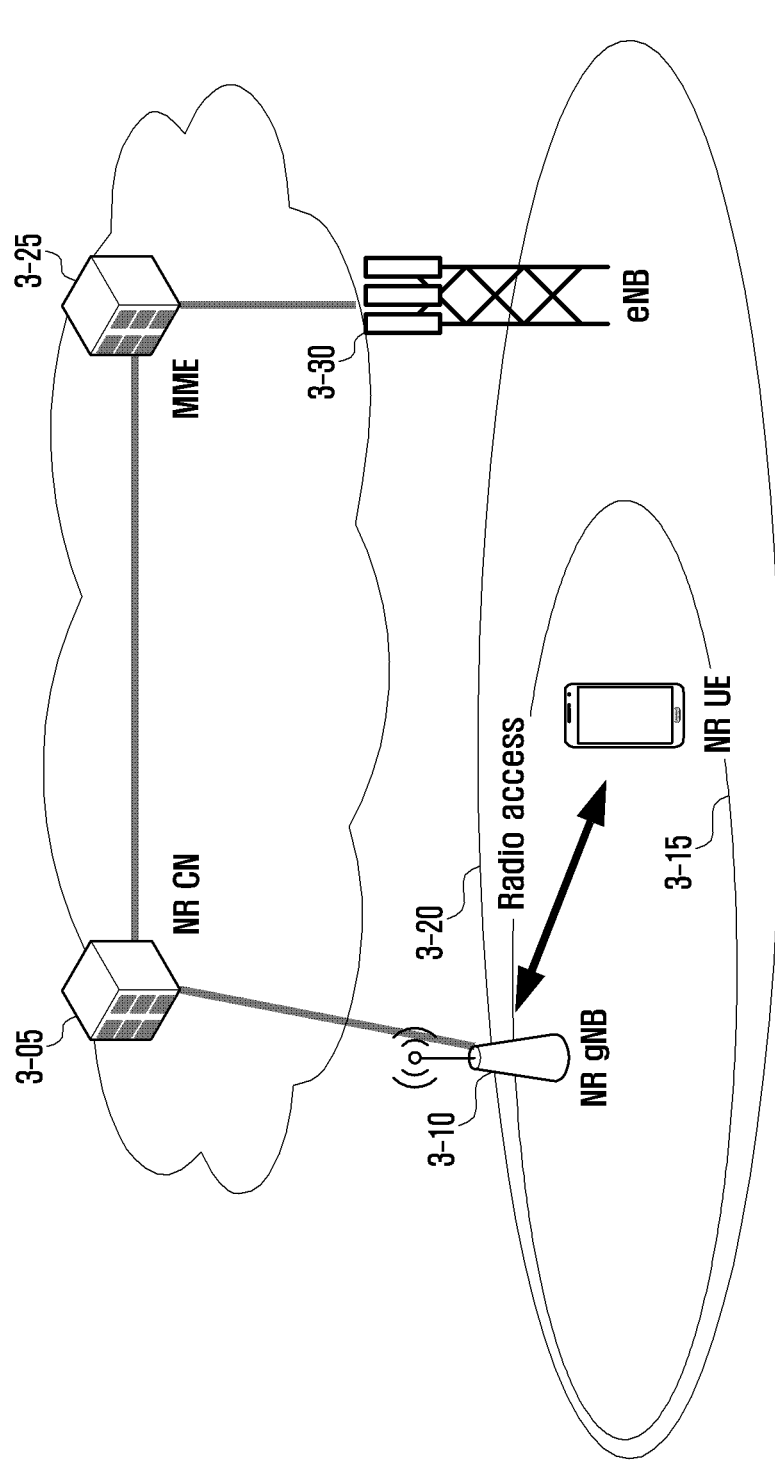
FIG. 3 illustrates a structure of a next-generation mobile communication system according to an embodiment of the disclosure.

FIG. 3 illustrates a structure of a next-generation mobile communication system according to an embodiment of the disclosure.

Referring to FIG. 3, as illustrated in FIG. 3, a radio access network of the next-generation mobile communication system (hereinafter, referred to as NR or 2g) includes a next-generation base station 3-10 (new radio node B, hereinafter, referred to as an NR gNB or an NR NB) and a new radio core network (NR CN) 3-05. A user terminal 3-15 (hereinafter, referred to as a new radio user equipment (NR UE) or a terminal) accesses an external network through the NR gNB 3-10 and the NR CN 3-05.

In FIG. 3, the NR gNB 3-10 corresponds to an evolved Node B (eNB) in a conventional LTE system. The NR gNB may be connected to the NR UE 3-15 through a radio channel and may provide better service than the conventional node B. Since all user traffic is served through a shared channel in the next-generation mobile communication system, an apparatus for collecting and scheduling status information of buffer statuses, available transmission power statuses, and channel statuses of UEs is required, and the NR NB 3-10 serves as this apparatus. One NR gNB generally controls a plurality of cells. The NR gNB may have a bandwidth wider than the conventional maximum bandwidth in order to implement super-high-speed data transmission compared to conventional LTE and may apply Orthogonal Frequency Division Multiplexing (OFDM) through radio access technology and further apply beamforming technology. Further, an adaptive modulation and coding (AMC) scheme of determining a modulation scheme and a channel coding rate is applied depending on the channel status of the UE. The NR CN 3-05 performs a function of supporting mobility, configuring a bearer, and configuring a quality of service (QoS). The NR core network (CN) is a device for performing a function of managing the mobility of the UE and various control functions, and is connected to a plurality of base stations. Further, the next-generation mobile communication system may be linked to the conventional LTE system, and the NR CN is connected to an MME 3-25 through a network interface. The MME is connected to an eNB 3-30, which is a conventional base station.

Figure 4:
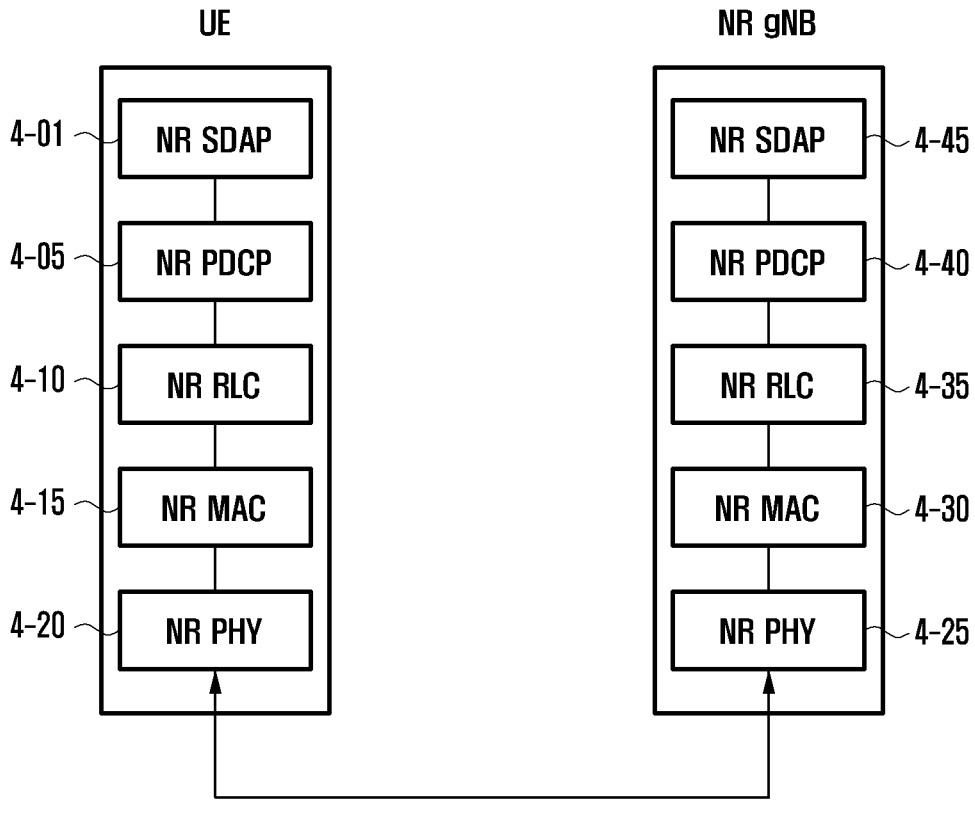
FIG. 4 illustrates a wireless protocol structure of the next-generation mobile communication system according to an embodiment of the disclosure.

FIG. 4 illustrates a wireless protocol structure of the next-generation mobile communication system according to an embodiment of the disclosure.

FIG. 4 illustrates the wireless protocol structure of the next-generation mobile communication system to which the disclosure can be applied.

Referring to FIG. 4, the UE and the NR gNB include NR SDAPs 4-01 and 4-45, NR PDCPs 4-05 and 4-40, NR RLCs 4-10 and 4-35, and NR MACs 4-15 and 4-30 in the wireless protocol of the next-generation mobile communication system.

Main functions of the NR SDAPs 4-01 and 4-45 may include some of the following functions.

User data transmission function (transfer of user-plane data)

Function of mapping QoS flow and a data bearer for uplink and downlink (mapping between a QoS flow and a data radio bearer (DRB) for both downlink (DL) and UL)

Function of marking a QoS flow ID for uplink and downlink (marking QoS flow ID in both DL and UL packets)

Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

Main functions of the NR PDCP 4-05 and 4-40 may include some of the following functions.

Header compression and decompression function (Header compression and decompression: ROHC only)

User data transmission function (Transfer of user data)

Sequential delivery function (In-sequence delivery of upper layer PDUs)

Non-sequential delivery function (Out-of-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU removal function (Timer-based SDU discard in uplink)

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the recorded data regardless of the order, a function of recording PDCP PDUs lost due to the reordering, a function of reporting statuses of the lost PDCP PDUs to a transmitting side, and a function of making a request for retransmitting the lost PDCP PDUs.

Main functions of the NR RLCs 4-10 and 4-35 may include some of the following functions.

Data transmission function (Transfer of upper layer PDUs)

Sequential delivery function (In-sequence delivery of upper layer PDUs)

Non-sequential delivery function (Out-of-sequence delivery of upper layer PDUs)

ARQ function (Error correction through ARQ)

Concatenation, segmentation, and reassembly function (Concatenation, segmentation, and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU deletion function (RLC SDU discard)

RLC re-establishment function (RLC re-establishment)

The sequential delivery function (In-sequence delivery) of the NR RLC device is a function of sequentially transferring PDCP SDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC sequence number (SN) or a PDCP sequence number (SN), a function of recording PDCP PDUs lost due to the reordering, a function of reporting statuses of the lost PDCP PDUs to a transmitting side, a function of making a request for retransmitting the lost PDCP PDUs, a function of, if there is a lost RLC SDU, sequentially transferring only RLC SDUs preceding the lost RLC SDU to the higher layer, a function of, if a predetermined timer expires even though there is a lost RLC SDU, sequentially transferring all RLC SDUs received before the timer starts to the higher layer, or a function of, if a predetermined timer expires even though there is a lost RLC SDU, sequentially transferring all RLC SDUs received up to that point in time to the higher layer. Further, the NR RLC device may process the RLC PDUs sequentially in a reception order thereof (according to an arrival order regardless of a serial number or a sequence number) and may transfer the RLC PDUs to the PDCP device regardless of the sequence thereof (out-of-sequence delivery). In the case of segments, the NR RLC device may receive segments which are stored in the buffer or will be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 4-15 and 4-30 may be connected to a plurality of NR RLC layer devices configured in one UE and main functions of the NR MAC may include some of the following functions.

Mapping function (Mapping between logical channels and transport channels)

Multiplexing and demultiplexing function (Multiplexing/demultiplexing of MAC SDUs)

Scheduling information report function (Scheduling information reporting)

HARQ function (Error correction through HARQ)

Logical channel priority control function (Priority handling between logical channels of one UE)

UE priority control function (Priority handling between UEs by means of dynamic scheduling)

MBMS service identification function (MBMS service identification)

Transport format selection function (Transport format selection)

Padding function (Padding)

The NR PHY layers 4-20 and 4-25 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 5:
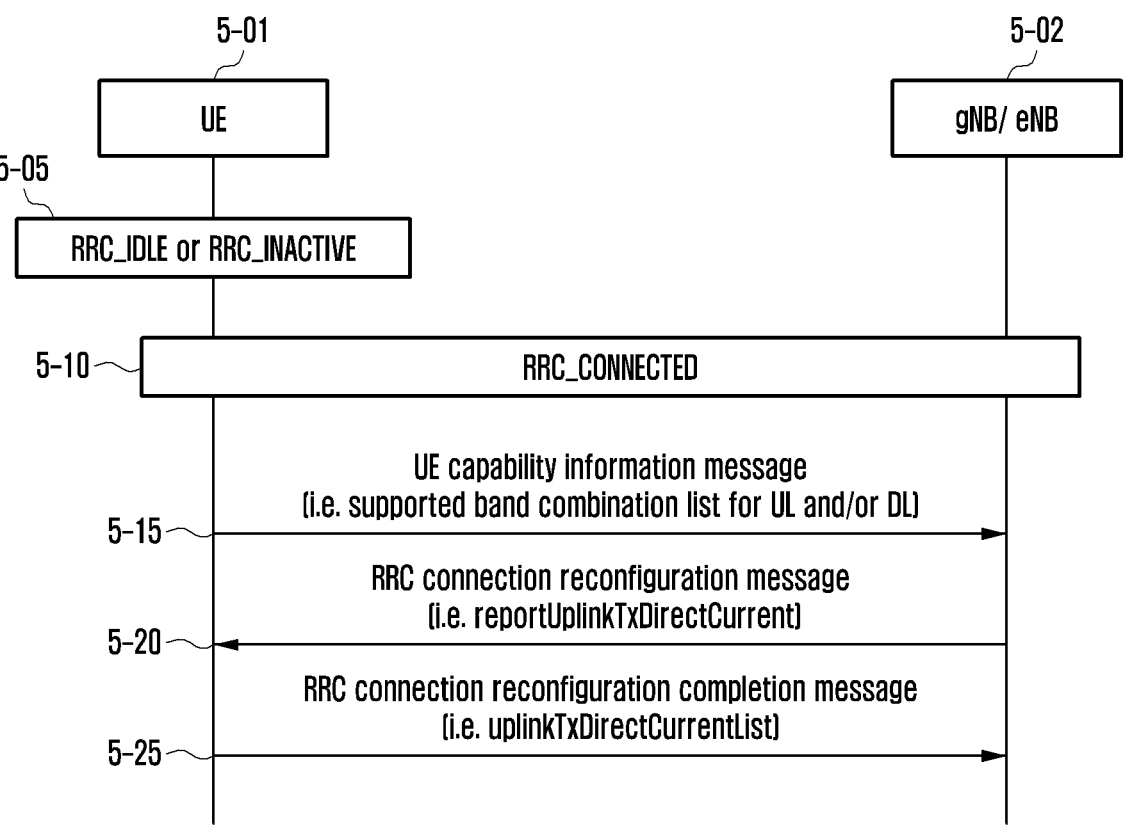
FIG. 5 illustrates an operation in which the UE reports an uplink Tx direct current list to the gNB/eNB according to an embodiment of the disclosure.

FIG. 5 illustrates an operation in which the UE reports an uplink Tx direct current list to the gNB/eNB according to an embodiment of the disclosure.

According to an embodiment of the disclosure, the UE 5-01 may be in a radio resource control (RRC) idle mode (RRC_IDLE) or an RRC inactive mode (RRC_INACTIVE) in operation 5-05.

The UE 5-01 in the RRC idle mode may switch to an RRC-connected mode (RRC_CONNECTED) through an RRC connection establishment procedure with a gNB/eNB 5-02 in operation 5-10. The UE 5-01 in the RRC inactive mode may switch to the RRC-connected mode (RRC_CONNECTED) through an RRC connection resume procedure with the gNB/eNB 5-02 in operation 5-10.

The UE 5-01 in the RRC-connected mode may exchange radio access capability information of the UE through a UE capability transfer procedure with the gNB/eNB 5-02. For example, in operation 5-15, the UE may transmit a supportable band combination list to the gNB/eNB through a UE capability information message (for example, UECapabilityInformation). The BandCombinationList may be a list of band combinations which can be supported in each of the UL (normal uplink), the supplementary uplink (SUL), and the downlink (DL).

In operation 5-20, the gNB/eNB 5-02 may transmit an RRC connection reconfiguration message (for example, RRCReconfiguration) to the UE 5-01. The RRC connection reconfiguration message may include cell group configuration information (CellGroupConfig), radio bearer configuration information (radioBearerConfig), and the like. Through the cell group configuration information and the radio bearer configuration information, the gNB/eNB 5-02 may configure UL carrier aggregation (hereinafter, referred to as CA) in the UE 5-01. When master cell group configuration information (masterCellGroup) including reportUplinkTxDirectCurrent is received, the UE 5-01 may insert an uplinkTxDirectCurrentList into an RRC connection reconfiguration completion message (for example, RRCReconfigurationComplete) and transmit the RRC connection reconfiguration completion message to the gNB/eNB 5-02 in operation 5-20.

The UE 5-01 may insert the uplinkTxDirectCurrentList for each master cell group (MGC) serving cell for the uplink (normal uplink) into the RRC connection reconfiguration completion message.

The UE 5-01 may insert the uplinkTxDirectCurrentList receiving uplinkDirectCurrentBWP-SUL for each MCG serving cell in which a supplementary uplink (SUL) carrier is configured into the RRC connection reconfiguration completion message.

When secondary cell group configuration information (secondaryCellGroup) including reportUplinkTxDirectCurrent is received, the UE 5-01 may insert the uplinkTxDirectCurrentList into the RRC connection reconfiguration completion message and transmit the RRC connection reconfiguration completion message to the gNB/eNB 5-02 in operation 5-20.

The UE 5-01 may insert the uplinkTxDirectCurrentList for each SCG serving cell for the uplink (normal uplink) into the RRC connection reconfiguration completion message.

The UE 5-01 may insert the uplinkTxDirectCurrentList receiving uplinkDirectCurrentBWP-SUL for each SCG serving cell in which a supplementary uplink (SUL) carrier is configured into the RRC connection reconfiguration completion message.

The uplinkTxDirectCurrentList may have the structure of ASN.1.

UplinkTxDirectCurrentList

The IE UplinkTxDirectCurrentList indicates the Tx Direct Current locations per serving cell for each configured UL BWP in the serving cell, based on the BWP numerology and the associated carrier bandwidth.

| UplinkTxDirectCurrentList information element |
| --- |

```
-- ASN1START
-- TAG-UPLINKTXDIRECTCURRENTLIST-START
UplinkTxDirectCurrentList ::=        SEQUENCE (SIZE
                                     (1..maxNrofServingCells)) OF
                                     UplinkTxDirectCurrentCell
UplinkTxDirectCurrentCell ::=        SEQUENCE {
  servCellIndex                        ServCellIndex,
  uplinkDirectCurrentBWP               SEQUENCE (SIZE
                                       (1..maxNrofBWPs)) OF
                                       UplinkTxDirectCurrentBWP,
  ...,
  [[
  uplinkDirectCurrentBWP-SUL           SEQUENCE (SIZE
                                       (1..maxNrofBWPs)) OF
                                       UplinkTxDirectCurrentBWP
```

-continued

| UplinkTxDirectCurrentList information element |
| --- |

```
  OPTIONAL
  ]]
}
UplinkTxDirectCurrentBWP ::=         SEQUENCE {
  bwp-Id                               BWP-Id,
  shift7dot5kHz                        BOOLEAN,
  txDirectCurrentLocation              INTEGER (0..3301)
}
-- TAG-UPLINKTXDIRECTCURRENTLIST-STOP
-- ASN1STOP
```

| UplinkTxDirectCurrentBWP field descriptions |
| --- | bwp-Id
The BWP-Id of the corresponding uplink BWP.
shift7dot5kHz
Indicates whether there is 7.5 kHz shift or not. 7.5 kHz shift is applied if the field is set to true. Otherwise 7.5 kHz shift is not applied.
txDirectCurrentLocation
The uplink Tx Direct Current location for the carrier. Only values in the value range of this field between 0 and 3299, which indicate the subcarrier index within the carrier corresponding to the numerology of the corresponding uplink BWP and value 3300, which indicates "Outside the carrier" and value 3301, which indicates "Undetermined position within the carrier" are used in this version of the specification.

| UplinkTxDirectCurrentCell field descriptions |
| --- | servCellIndex
The serving cell ID of the serving cell corresponding to the uplinkDirectCurrentBWP.
uplinkDirectCurrentBWP
The Tx Direct Current locations for all the uplink BWPs configured at the corresponding serving cell.
uplinkDirectCurrentBWP-SUL
The Tx Direct Current locations for all the supplementary uplink BWPs configured at the corresponding serving cell.

In an embodiment of the disclosure, the UE may report a Tx direct current location to the gNB/eNB for one or a plurality of BWPs configured for each serving cell, and when the UL and the SUL are simultaneously configured in one serving cell, the Tx direct current location may be reported to the gNB/eNB for one or a plurality of BWPs configured in each of the UL and the SUL of the corresponding serving cell. However, the Tx direct current location considering intra-band UL CA is not additionally reported to the gNB/eNB. For example, when intra-band UL CA is configured in the UE through two UL component carriers (CAs) and three BWPs are configured for each serving cell, the UE does not report the Tx direct current location to the gNB/eNB with respect to nine available BWP combinations.

| Serving cell 1 (PCell) | Serving cell 2 (Scell) | DC location for UL CA |
| --- | --- | --- |
| BWP Id = 1 | BWP Id = 1 | NO |
| BWP Id = 1 | BWP Id = 2 | NO |
| BWP Id = 1 | BWP Id = 3 | NO |
| BWP Id = 2 | BWP Id = 1 | NO |
| BWP Id = 2 | BWP Id = 2 | NO |
| BWP Id = 2 | BWP Id = 3 | NO |
| BWP Id = 3 | BWP Id = 1 | NO |

-continued

| Serving cell 1 (PCell) | Serving cell 2 (Scell) | DC location for UL CA |
|---|---|---|
| BWP Id = 3 | BWP Id = 2 | NO |
| BWP Id = 3 | BWP Id = 3 | NO |

When the UE does not additionally report the Tx direct current location considering the intra-band UL CA to the gNB/eNB, the gNB/eNB may have difficulty in accurately cancelling carrier leakage for an uplink modulated signal transmitted by the UE applying intra-band UL CA (for example, difficulty in accurately predicting an IQ offset in demodulation), thereby resulting in low demodulation performance.

In an embodiment of the disclosure, the case in which the UE reports the uplinkTxDirectCurretList to the gNB/eNB through the RRC connection reconfiguration procedure for convenience of description, but the UE may report the uplinkTxDirectCurretList to the gNB/eNB through the RRC connection resume procedure through the same principle as the above-described method.

Figure 6:
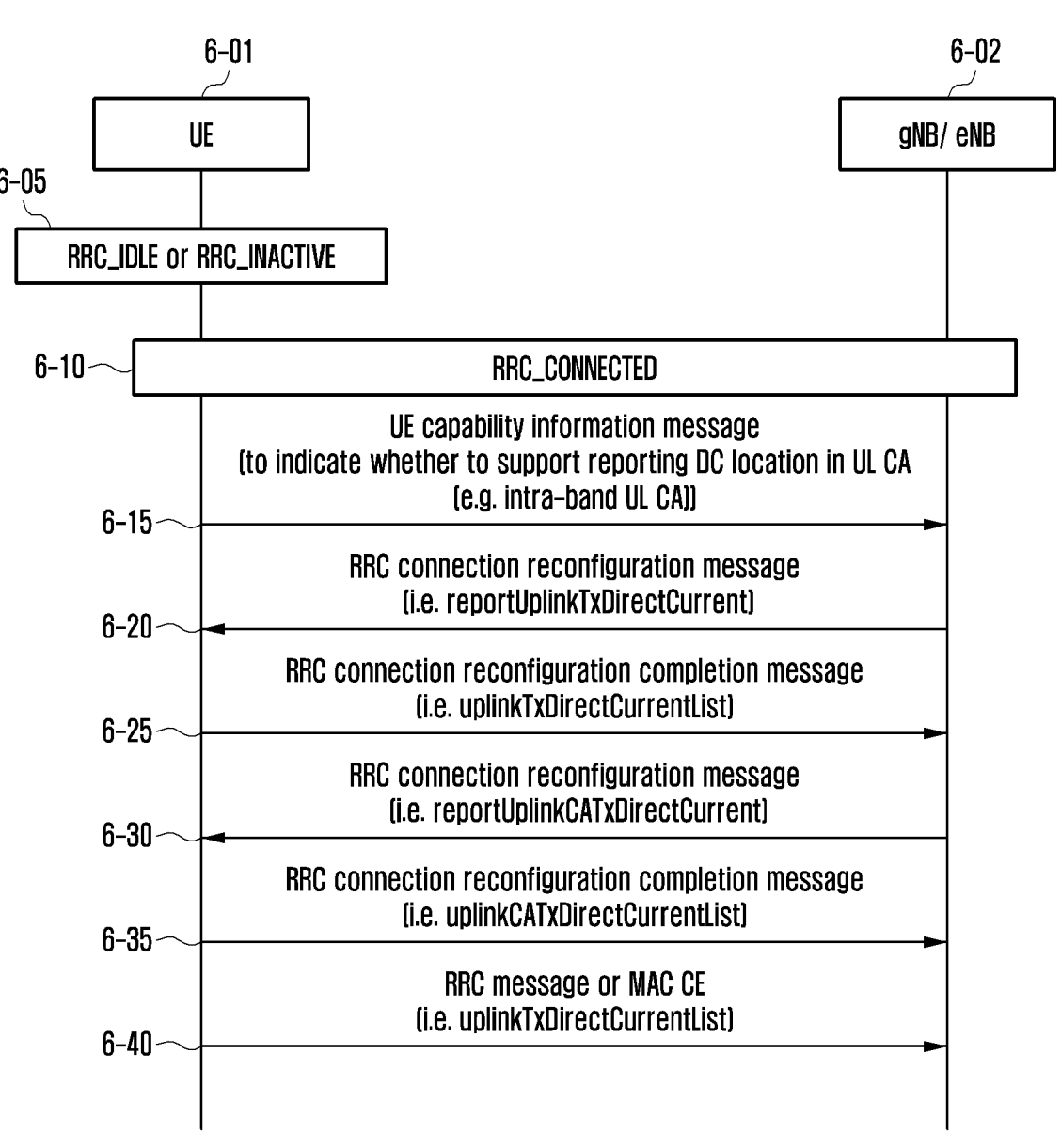
FIG. 6 illustrates an operation in which the UE efficiently reports uplinkCATxDirectCurrentList for intra-band UL CA to the gNB/eNB according to an embodiment of the disclosure.

FIG. 6 illustrates an operation in which the UE reports the Tx direct current location considering intra-band UL CA to the BS when intra-band UL CA is configured in the UE, that is, an operation in which the UE efficiently reports the uplinkCATxDirectCurrentList for the intra-band UL CA to the gNB/eNB according to an embodiment of the disclosure.

In the disclosure, the uplinkCATxDirectCurrentList is an illustrative name as an information element indicating a list of Tx direct current locations for BWP combinations configured in the UE in which intra-band UL CA is configured. Similarly, the reportUplinkCATxDirectCurrent is an illustrative name meaning an information element indicating a report on Tx direct current locations for BWP combinations of the UE in which intra-band UL CA is configured.

According to an embodiment of the disclosure, the UE 6-01 may be in the RRC idle mode (RRC_IDLE) or the RRC inactive mode (RRC_INACTIVE) in operation 6-05.

The UE 6-01 in the RRC idle mode may switch to the RRC-connected mode (RRC_CONNECTED) through an RRC connection establishment procedure with the gNB/eNB 6-02 in operation 6-10. The UE 5-01 in the RRC inactive mode may switch to the RRC-connected mode (RRC_CONNECTED) through an RRC connection resume procedure with the gNB/eNB 6-02 in operation 6-10.

The UE 6-01 in the RRC-connected mode may exchange radio access capability information of the UE through a UE capability transfer procedure with the gNB/eNB 6-02. For example, in operation 6-15, the UE may transmit a supportable band combination list to the gNB/eNB through a UE capability information message (for example, UECapabilityInformation). The BandCombinationList may be a band combination list which can be supported in each of the UL (normal uplink), the supplementary uplink (SUL), and the downlink (DL). In addition, when intra-band UL CA is configured, the UE may report a capability for reporting the uplinkCATxDirectCurrentList for intra-band UL CA to the gNB/eNB in operation 6-15. For example, the UE in which intra-band UL CA is configured may mean an indicator indicating a capability for reporting the uplinkCATxDirectCurrentList for a BWP combination requested by the gNB/eNB for the corresponding intra-band UL CA or, when a predetermined condition is satisfied, an indicator or an information element indicating a capability for reporting the uplinkCATxDirectCurrentList for a specific BWP combination in intra-band UL CA. Alternatively, the UE may report an indicator or an information element indicating a capability for reporting the uplinkCATxDirectCurrentList for each FR, intra-band UL CA, or inter-band UL CA to the BS through operation 6-15.

In operation 6-20, the NR gNB 6-02 may transmit an RRC connection reconfiguration message (for example, RRCReconfiguration) to the UE 6-01. The RRC connection reconfiguration message may include cell group configuration information (CellGroupConfig), radio bearer configuration information (radioBearerConfig), and the like. Through the cell group configuration information and the radio bearer configuration information, the gNB/eNB 6-02 may configure UL carrier aggregation (hereinafter, referred to as CA) in the UE 6-01. When master cell group configuration information (masterCellGroup) and/or secondary cell group configuration information (SecondaryCellGroup) including reportUplinkTxDirectCurrent is received, the UE 6-01 may insert the uplinkTxDirectCurrentList for each cell group into the RRC connection reconfiguration completion message (for example, RRCReconfigurationComplete) and transmit the RRC connection reconfiguration completion message to the gNB/eNB 5-02 in operation 6-25.

In operation 6-30, the NR gNB 6-02 may transmit an RRC connection reconfiguration message (for example, RRCReconfiguration) in order to make a request for the uplinkCATxDirectCurrentList to the UE 6-01 in which intra-band UL CA is configured. The RRC connection reconfiguration message may include an information element (for example, reportUplinkCATxDirectCurrent) making a request for only BWP combinations which the BS is interested in among the BWP combinations configured in intra-band UL CA. The reason why the BS makes a request for only specific BWP combinations is to reduce signaling overhead between the UE and the gNB/eNB. Otherwise, the uplinkCATxDirectCurrentList which the UE should report may exponentially increase. For example, when three BWPs are configured in each CC in intra-band UL CA, the UE should report Tx direct current values to the gNB/eNB with respect to the number of cases which is 9 in 2 CCs and the number of cases which is 27 in 3 CCs. The gNB/eNB may make a request for Tx direct current values to the UE with respect to BWP combinations which a serving cell in which higher-order modulation is configured (for example, 256 QAM) in intra-band UL CA, a serving cell in which a modulation and coding scheme (MCS) table for higher-order modulation is configured, a serving cell in which subcarrier spacing (SCS) is configured as a high value, and a serving cell in which numerology for each BWP combination is different.

That is, the information element may include a BWP Id list for each serving cell of intra-band UL CA. For example, when the gNB/eNB desires to know the uplinkCATxDirect-CurrentList only for (BWP Id of PCell=1, BWP Id of SCell=1), (BWP Id of PCell=2, BWP Id of SCell=1), the BWP ID lists [1,1] and [2,1] may be inserted into the RRC connection reconfiguration message.

> CellGroupConfig
>> reportUplinkCarrierAggregationTxDirectCurrent
>>> Reque stedBwpCombinationList
>>>> RequestedBwpCombination
>>>>> list of BWPid (i.e., Two RequestedBwpCombination will be included in the message ([1,1] and [2,1])

| Serving cell 1 (PCell) | Serving cell 2 (Scell) | DC location for UL CA |
|---|---|---|
| BWP Id = 1 | BWP Id = 1 | YES |
| BWP Id = 1 | BWP Id = 2 | |

-continued

| Serving cell 1 (PCell) | Serving cell 2 (Scell) | DC location for UL CA |
|---|---|---|
| BWP Id = 1 | BWP Id = 3 | |
| BWP Id = 2 | BWP Id = 1 | YES |
| BWP Id = 2 | BWP Id = 2 | |
| BWP Id = 2 | BWP Id = 3 | |
| BWP Id = 3 | BWP Id = 1 | |
| BWP Id = 3 | BWP Id = 2 | |
| BWP Id = 3 | BWP Id = 3 | |

The reportUplinkCarrierAggregationTxDirectCurrent does not include an identifier for identifying a serving cell (servCellIndex). For example, when the BWP Id list is [2,1], a cell indicated by the first BWP Id may be a PCell (BWP Id=2 for PCell) and a cell indicated by a second BWP Id may be an SCell (BWP Id=1 for SCell). In a situation considering dual connectivity or when the gNB/eNB makes a request for only BWP combinations in which the gNB/eNB is interested among combinations of specific serving cells in intra-band CA, the gNB/eNB may also insert the identifier for identifying the serving cell into the reportUplinkCATxDirectCurrent in operation 6-30. For reference, the servCellIndex is configured as follows. For reference, when the UL and the SUL are configured for one serving cell, the information may be separately reported for the UL and the SUL or may be reported only for the UL.

ServCellIndex

The IE ServCellIndex concerns a short identity, used to identify a serving cell (i.e., the PCell, the PSCell or an SCell). Value 0 applies for the PCell, while the SCellIndex that has previously been assigned applies for SCells.

---
ServCellIndex information element
---
```
-- ASN1START
-- TAG-SERVCELLINDEX-START
ServCellIndex ::=        INTEGER (0..maxNrofServingCells-1)
maxNrofServingCells-1    INTEGER ::= 31 -- Max number of serving
cells (SpCell + SCells) per cell group
-- TAG-SERVCELLINDEX-STOP
-- ASN1STOP
```
---

When the UE 6-01 receives the RRC connection reconfiguration message including an information element (for example, reportUplinkCATxDirectCurrent) making a request for only interesting BWP combinations among the BWP combinations configured in intra-band UL CA from the gNB/eNB 6-02 I operation 6-30, the UE may transmit the RRC connection reconfiguration completion message including the uplinkCATxDirectCurrentList for the requested BWP combinations to the gNB/eNB in operation 6-35. For example, the UE may include the following information for each of the requested BWP combinations.

Serving cell identifier (servCellIndex)

A txDirectCurrentLocation value based on the serving cell identifier

Specifically, the information may be indicated by the structure of ASN.1 as described below.

```
UplinkCaTxDirectCurrentList ::=       SEQUENCE (SIZE (1..maxNrofRequestedBw
pCombination)) OF UplinkCaTxDirectCurrent,
UplinkCaTxDirectCurrent ::=           SEQUENCE {,
    servCellIndex                         ServCellIndex,
    txDirectCurrentLocation               INTEGER (0..3301) ,
},
```

When SCS is high, the UE may report the UplinkCATx-DirectCurrentList of txDirectCurrentLocation to the gNB/eNB by using smaller bits in operation 6-35. For example, since the value of currently reported txDirectCurrentLocation is one of INTEGERs (0 . . . 3301), 12 bits are used and a range is determined on the basis of 15 kHz SCS regardless of SCS, and thus currently available physical resource block (hereinafter, referred to as a PRB) is 275 one PRB is 15 kHz SCS*12 subcarrier index 275*12=3300

If smaller bits (for example, 8 bits for 120 kHz SCS) are used to indicate a range of txDirectCurrentLocation when SCS is high, the UE has an advantage of reporting the txDirectCurrentLocation with signaling overhead smaller than the previous signaling overhead.

Operation 6-20 and operation 6-30 may be performed through one RRC connection reconfiguration message in which case operation 6-25 and operation 6-35 may be performed through one RRC connection reconfiguration completion message.

In operation 6-40, the UE may report a serving cell identifier and a Tx Direct Current Location mapped thereto to the gNB/eNB with respect to only BWP combinations activated in intra-band CA (for example, through BWP switching) (one BWP activated for each UL/SUL in one serving cell). Alternatively, when some Tx Direction Current values in the uplinkCATxDirectCurrentList reported in operation 6-35 are changed, the UE may report changed values and the serving cell identifier to the gNB/eNB. However, when SCS of a specific BWP is changed, the UE does not report the same again and the gNB/eNB may infer the same from the previously reported value. For example, the UE may report the Tx Direct Current Location and/or the serving cell identifier to the gNB/eNB through a MAC CE or a predetermined RRC message.

In an embodiment of the disclosure, the case in which the UE reports the uplinkCATxDirectCurretList to the gNB/eNB through the RRCReconfiguration procedure is considered for convenience of description, but the UE may report the uplinkCATxDirectCurretList to the gNB/eNB through the RRCResume procedure on the basis of the same principle as the above-described method. Further, the UE and the gNB/eNB may apply the same principle as the above-described method for each inter-band UL CA or each frequency range (FR).

Figure 7:
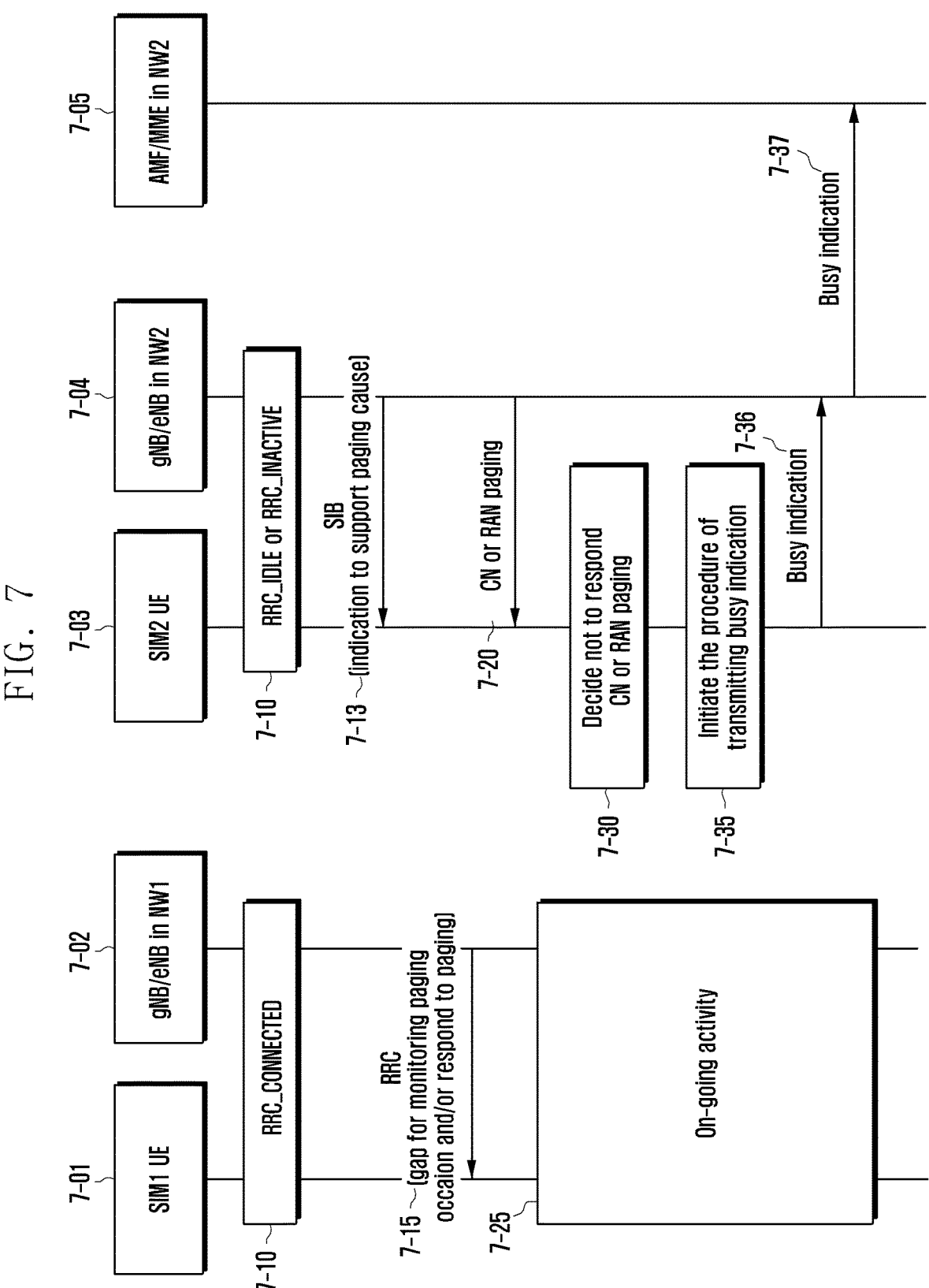
FIG. 7 is a flowchart illustrating a procedure in which one SIM UE among UEs supporting a plurality of subscriber identity modules (SIMs) (multi-SIM UEs) performs a process with the gNB/eNB according to an embodiment of the disclosure.

FIG. 7 is a flowchart illustrating a process in which one SIM UE among UEs (multi-SIM UEs) supporting a plurality of subscriber identity modules (SIMs) receives a paging message including a paging cause and transmits a busy indication to the gNB/eNB in response thereto according to an embodiment of the disclosure.

In operation 7-10, among multi-SIM UEs, a SIM1 UE 7-01 may be in an RRC-connected mode (RRC_CONNECTED) with gNB/eNB #1 7-02. At this time, among the multi-SIM UEs, a SIM2 UE 7-03 may be in an RRC idle mode (RRC_IDLE) or an RRC inactive mode (RRC_INACTIVE) with a gNB/eNB #2 7-04.

In operation 7-13, gNB/eNB #2 7-04 may broadcast system information including an indicator indicating that a paging message can contain a paging cause to the SIM2 UE 7-03 among the multi-SIM UEs. For example, the reason why the gNB/eNB #2 7-04 broadcasts the system information including the indicator indicating that the paging message can contain the paging cause is to determine whether the SIM2 UE 7-03 among the multi-SIM UEs can transmit the busy indication.

In operation 7-15, the SIM1 UE 7-01 among the multi-SIM UEs may receive, from gNB/eNB #1 7-02, a predetermined RRC message including gap configuration information (for example, information on a detailed time point) to monitor a paging occasion and/or respond to the paging message from gNB/eNB #2 7-04 by the SIM2 UE 7-03 among the multi-SIM UEs. For reference, the corresponding gap information may be first requested by the SIM1 UE 7-01 among the multi-SIM UEs and gNB/eNB #1 7-02 may configure the gap information in the SIM1 UE 7-01 among the multi-SIM UEs.

In operation 7-20, the SIM2 UE 7-03 among the multi-SIM UEs may receive the paging message from gNB/eNB #2 7-04. If the SIM2 UE 7-03 among the multi-SIM UEs is in the RRC idle mode, the SIM2 UE 7-03 among the multi-SIM UEs may receive a CN-initiated paging message from gNB/eNB #2 7-04.

of the conventionally defined pagingRecordList (the underlined part in [Table 8] indicates method 1). For example, when the conventionally defined pagingRecordList includes three pagingRecord (for example, PagingUE-Identity 1, PagingUE-Identity 2, PagingUE-Identity 3), the pagingCause may be included in each pagingRecord according to the same order. The disadvantage of method 1 is that a newly defined pagingRecordList should be necessarily broadcasted if the pagingCause should be included in one conventional PagingRecord. gNB/eNB #2 7-04 may transmit the paging message to the SIM2 UE 7-03 among the multi-SIM UEs, which can understand the pagingCause, by using a new pagingRecordList for another service, which is not the voice service. For example, when gNB/eNB #2 7-04 does not include the pagingCause, it may mean transmission of the paging message to the SIM2 UE 7-03 among the multi-SIM UEs for another service which is not the voice service. That is, gNB/eNB #2 7-04 may use the new pagingRecordList for a UE supporting a multi-SIM function (for example, a UE supporting a paging cause feature) and may transmit the paging message to a UE, which does not support the multi-SIM function, by using the conventionally defined pagingRecordList

| Paging ::= | SEQUENCE { | |
|---|---|---|
| pagingRecordList | PagingRecordList | OPTIONAL, -- Need N |
| lateNonCriticalExtension | OCTET STRING | OPTIONAL, |
| nonCriticalExtension | SEQUENCE {Paging-v17xy-IEs} | OPTIONAL |
| } | | |
| Paging-v17xy-IEs ::= | SEQUENCE { | |
| pagingRecordList-v17xy | PagingRecordList-v17xy | OPTIONAL, -- Need N |
| nonCriticalExtension | SEQUENCE{ } OPTIONAL | |
| } | | |
| PagingRecordList ::= | SEQUENCE (SIZE(1..maxNrofPageRec)) OF PagingRecord | |
| PagingRecordList-v17xy ::= | SEQUENCE (SIZE(1..maxNrofPageRec)) OF | |
| PagingRecord-v17xy | | |
| PagingRecord ::= | SEQUENCE { | |
| ue-Identity | PagingUE-Identity, | |
| accessType | ENUMERATED {non3GPP} OPTIONAL, -- Need N | |
| ... | | |
| } | | |
| PagingRecord-v17xy ::= | SEQUENCE { | |
| pagingCause-r17 | ENUMERATED {voice} OPTIONAL -- Need R | |
| } | | |

If the SIM2 UE 7-03 among the multi-SIM UEs is in the RRC inactive mode, the SIM2 UE 7-03 among the multi-SIM UEs may receive a CN-initiated paging message or an RAN-initiated paging message from gNB/eNB #2 7-04. The CN-initiated paging message may be a paging message generated by an AMF/MME 7-05, and the RAN-initiated paging message may be a paging message directly generated by gNB/eNB #2 7-04. If the SIM2 UE 7-03 among the multi-SIM UEs in the RRC inactive mode receives the CN-initiated paging message from gNB/eNB #2 7-04, the SIM2 UE may transition to the RRC idle mode. For reference, operation 7-20 may occur in the gap configured in operation 7-15.

In operation 7-20, gNB/eNB #2 7-04 may configure the paging message through at least one of the following methods to transmit the paging message to the SIM2 UE 7-03 among the multi-SIM UEs.

Method 1: a paging message may be configured by defining a new pagingRecordList in which the pagingCause can be included in according to the same order Method 2: a paging message may be configured by defining a new pagingRecordList including a ue-Idex and a paging cause for each pagingRecord in which the pagingCause should be included among the conventionally defined pagingRecordList (the underlined part in [Table 9] indicates method 2). Here, ue-Index may be a value indicating a PagingUE-Identity according to the order of the pagingRecord configured in the conventional pagingRecordList. For example, when the conventional pagingRecordList includes (pagingRecord 1, pagingRecord 2), it may mean a PagingUE-Identity included in pagingRecord 1 in which the ue-Index is '1', gNB/eNB #2 7-04 may transmit the paging message to the SIM2 UE 7-03 among the multi-SIM UEs, which can understand the pagingCause, by using a new pagingRecordList for another service, which is not the voice service. For example, when gNB/eNB #2 7-04 does not include the pagingCause, it may mean transmission of the paging message to the SIM2 UE 7-03 among the multi-SIM UEs for another service which is not the voice service. That is, gNB/eNB #2 7-04 may use the new pagingRecordList for a UE supporting a multi-SIM function (for example, a UE supporting a paging cause feature) and may transmit the paging message to a UE, which does not support the multi-SIM function, by using the conventionally defined pagingRecordList.

```
Paging ::=                    SEQUENCE {
    pagingRecordList              PagingRecordList                    OPTIONAL, -- Need N
    lateNonCriticalExtension          OCTET STRING                    OPTIONAL,
    nonCriticalExtension          SEQUENCE{Paging-v17xy-IEs}              OPTIONAL
}
Paging-v17xy-IEs ::=          SEQUENCE {
    pagingRecordList-v17xy            PagingRecordList-v17xy          OPTIONAL, -- Need N
    nonCriticalExtension          SEQUENCE{ }            OPTIONAL
}
PagingRecordList ::=              SEQUENCE (SIZE(1..maxNrofPageRec)) OF PagingRecord
PagingRecordList-v17xy ::=        SEQUENCE (SIZE(1..maxNrofPageRec)) OF
 PagingRecord-v17xy
PagingRecord ::=              SEQUENCE {
    ue-Identity                  PagingUE-Identity,
    accessType                   ENUMERATED {non3GPP}          OPTIONAL,  -- Need N
    ...
}
PagingRecord-v17xy ::=            SEQUENCE {
    ue-Index-r17                 INTEGER (1..maxNrofPageRec)
    pagingCause-r17              ENUMERATED {voice}    OPTIONAL -- Need R
}
```

Method 3: a paging message may be configured by configuring and defining new pagingRecordList2 separately from the conventionally defined pagingRecord-List. New pagingRecordList2 may include one or a plurality of pagingRecord including pagingCause (underlined part in [Table 10] indicates method 3). That is, the pagingRecord which does not include the paging-Cause may be included in the conventionally defined pagingRecordList, and the pagingRecord including the pagingCause may be included in new pagingRecord-List2. gNB/eNB #2 7-04 may transmit the paging message to the SIM2 UE 7-03 among the multi-SIM UEs, which can understand the pagingCause, by using a new pagingRecordList for another service, which is not the voice service. For example, when gNB/eNB #2 7-04 does not include the pagingCause, it may mean transmission of the paging message to the SIM2 UE 7-03 among the multi-SIM UEs for another service, which is not the voice service. That is, gNB/eNB #2 7-04 may use the new pagingRecordList for a UE supporting a multi-SIM function (for example, a UE supporting a paging cause feature) and may transmit the paging message to a UE, which does not support the multi-SIM function, by using the conventionally defined pagingRecordList.

```
Paging ::=                    SEQUENCE {
    pagingRecordList              PagingRecordList                    OPTIONAL, -- Need N
    lateNonCriticalExtension          OCTET STRING                    OPTIONAL,
    nonCriticalExtension          SEQUENCE{Paging-v17xy-IEs}              OPTIONAL
}
Paging-v17xy-IEs ::=          SEQUENCE {
    pagingRecordList2-r17            PagingRecordList2-r17          OPTIONAL, -- Need N
    nonCriticalExtension          SEQUENCE{ }            OPTIONAL
}
PagingRecordList ::=              SEQUENCE (SIZE(1..maxNrofPageRec)) OF PagingRecord
PagingRecordList2-r17 ::=          SEQUENCE (SIZE(1..maxNrofPageRec)) OF
 PagingRecord-r17
PagingRecord ::=              SEQUENCE {
    ue-Identity                  PagingUE-Identity,
    accessType                   ENUMERATED {non3GPP}          OPTIONAL,  -- Need N
    ...
}
PagingRecord-r17 ::=              SEQUENCE {
    ue-Identity                  PagingUE-Identity,
    accessType                   ENUMERATED {non3GPP}    OPTIONAL,  -- Need N
    paginingCause-r17            ENUMERATED {voice}        OPTIONAL -- Need R
}
```

In operation 7-25, the SIM1 UE 7-01 among the multi-SIM UEs may be transmitting and receiving a data service to and from gNB/eNB #1 7-02.

In operation 7-30, the SIM2 UE 7-03 among the multi-SIM UEs may determine to not respond to the paging message received from gNB/eNB #2 7-04 in order to continuously transmit and receive the data service to and from the SIM1 UE 7-01 among the multi-SIM UEs.

In operation 7-35, the SIM2 UE 7-03 among the multi-SIM UEs may initiate a procedure for transmitting the busy indication to gNB/eNB #2 7-04. When the paging message received in operation 7-20 includes a ue-Identity indicating the SIM2 UE 7-03 among the multi-SIM UEs and the paging cause and/or when the system information broadcasted by gNB/eNB #2 7-04 in operation 7-13 includes the indicator indicating that the paging message can contain the paging cause, a procedure for transmitting the busy indication may be initiated. If the SIM2 UE 7-03 among the multi-SIM UEs is in the RRC idle mode, the indicator or information indicating the busy indication (for example, a value of the reason why the response to the paging message cannot be made to continuously perform data transmission and reception to another SIM and/or information indicating duration during which the response to the paging message cannot be made) may be included in the RRC connection configuration completion message (RRCSetupComplete or RRCConnectionSetupComplete) through an RRC connection establishment procedure and the RRC connection configuration completion message may be transmitted to gNB/eNB #2 7-04. For reference, the indicator or the information indicating the busy indication may be included in a NAS message included in the RRC connection configuration completion message. If the SIM2 UE 7-03 among the multi-SIM UEs is in the RRC inactive mode, the indicator or the information indicating the busy indication may be transmitted to the gNB/eNB #2 7-04 through the RRC connection resume procedure. Specifically, the indicator or the information indicating the busy indication may be included in an RRC connection resume request message (RRCConnectionResumeRequest or RRCResumeRequest or RRCResumeRequest1) or an RRC connection resume completion message.

In operation 7-37, gNB/eNB #2 7-04 may transfer the indicator or the information indicating the busy indication received from the SIM2 UE 7-03 among the multi-SIM UEs to the AMF/MME 7-05.

The disclosure describes only the paging cause for a voice service (for example, VoNR or VoLTE) but a paging cause for a non-voice service rather than the voice service may be included. For example, a paging cause indicating at least one of an SMS, a critical service, IMS signaling, CP signaling, or other data may be included (for example, pagingCause-r16 ENUMERATE{voice, SMS, IMS signaling, CP signaling}). Further, for the purpose of the later use, it is possible to define spare values for a plurality of paging causes (for example, pagingCause-r16 ENUMERATE{voice, spare 3, spare 2, spare 1}).

Figure 8:
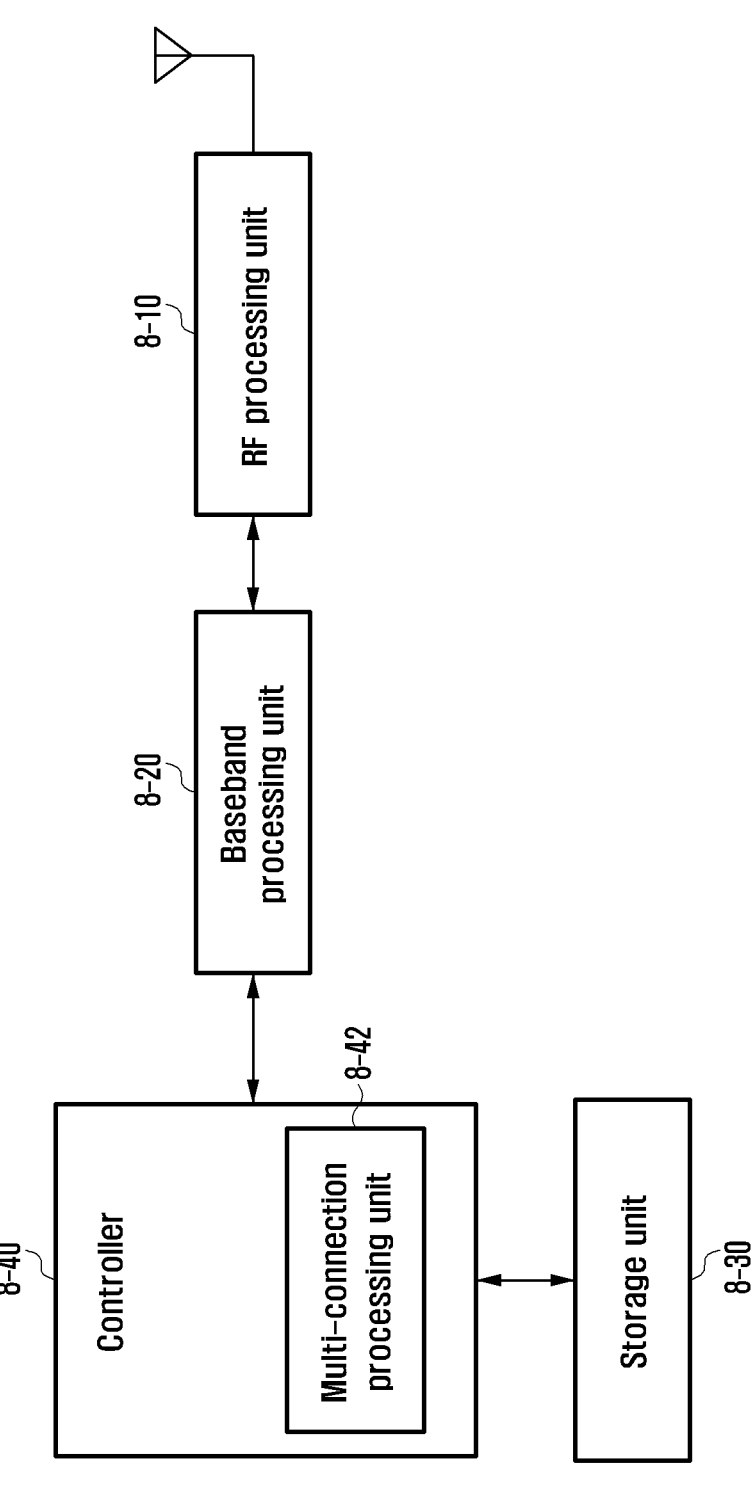
FIG. 8 is a block diagram illustrating an internal structure of the UE according to an embodiment of the disclosure.

FIG. 8 is a block diagram illustrating an internal structure of the UE according to an embodiment of the disclosure.

Referring to FIG. 8, the UE includes a radio-frequency (RF) processing unit 8-10, a baseband processing unit 8-20, a storage unit 8-30, and a controller 8-40.

The RF processing unit 8-10 performs a function of transmitting and receiving a signal through a radio channel such as converting or amplifying a band of the signal. That is, the RF processing unit 8-10 up-converts a baseband signal provided from the baseband processing unit 8-20 into an RF band signal, transmits the RF band signal through an antenna, and then down-converts the RF band signal received through the antenna into a baseband signal. For example, the RF processing unit 8-10 may include a transmission filter, a reception filter, an amplifier, a mixer, an oscillator, a digital-to-analog converter (DAC), an analog-to-digital converter (ADC), and the like. Although FIG. 8 illustrates only one antenna, the UE may include a plurality of antennas. The RF processing unit 8-10 may include a plurality of RF chains. Moreover, the RF processing unit 8-10 may perform beamforming. For the beamforming, the RF processing unit 8-10 may control a phase and a size of each of the signals transmitted/received through a plurality of antennas or antenna elements. The RF processing unit may perform MIMO and receive a plurality of layers when performing the MIMO operation.

The baseband processing unit 8-20 performs a function for a conversion between a baseband signal and a bitstream according to a physical layer standard of the system. For example, in data transmission, the baseband processing unit 8-20 generates complex symbols by encoding and modulating a transmission bitstream. Further, in data reception, the baseband processing unit 8-20 reconstructs a reception bitstream by demodulating and decoding a baseband signal provided from the RF processing unit 8-10. For example, in an orthogonal frequency-division multiplexing (OFDM) scheme, when data is transmitted, the baseband processing unit 8-20 generates complex symbols by encoding and modulating a transmission bitstream, maps the complex symbols to subcarriers, and then configures OFDM symbols through an inverse fast Fourier transform (IFFT) operation and a cyclic prefix (CP) insertion. Further, when data is received, the baseband processing unit 8-20 divides the baseband signal provided from the RF processing unit 8-10 in the unit of OFDM symbols, reconstructs the signals mapped to the subcarriers through a fast Fourier transform (FFT) operation, and then reconstructs a reception bitstream through demodulation and decoding.

The baseband processing unit 8-20 and the RF processing unit 8-10 may transmit and receive the signal as described above. Accordingly, each of the baseband processing unit 8-20 and the RF processing unit 8-10 may be called a transmitter, a receiver, a transceiver, or a communication unit. Further, at least one of the baseband processing unit 8-20 and the RF processing unit 8-10 may a plurality of communication modules to support a plurality of different radio access technologies. At least one of the baseband processing unit 8-20 and the RF processing unit 8-10 may include different communication modules to process signals in different frequency bands. For example, the different radio access technologies may include a wireless LAN (for example, IEEE 802.11) and a cellular network (for example, LTE). Further, the different frequency bands may include a super high frequency (SHF) (for example, 2.NRHz, NRhz) band and a millimeter (mm) wave (for example, 60 GHz) band.

The storage unit 8-30 stores data such as a basic program, an application, configuration information, and the like for the operation of the UE. Particularly, the storage unit 8-30 may store information related to a second access node performing wireless communication through a second radio access technology. The storage unit 8-30 provides stored data according to a request from the controller 8-40.

The controller 8-40 controls the overall operation of the UE. For example, the controller 8-40 transmits and receives signals through the baseband processing unit 8-20 and the RF processing unit 8-10. Further, the controller 8-40 records data in the storage unit 8-40 and reads the data. To this end, the controller 8-40 may include at least one processor. For example, the controller 8-40 may include a communication processor (CP) that performs a control for communication, and an application processor (AP) that controls a higher layer such as an application.

Figure 9:
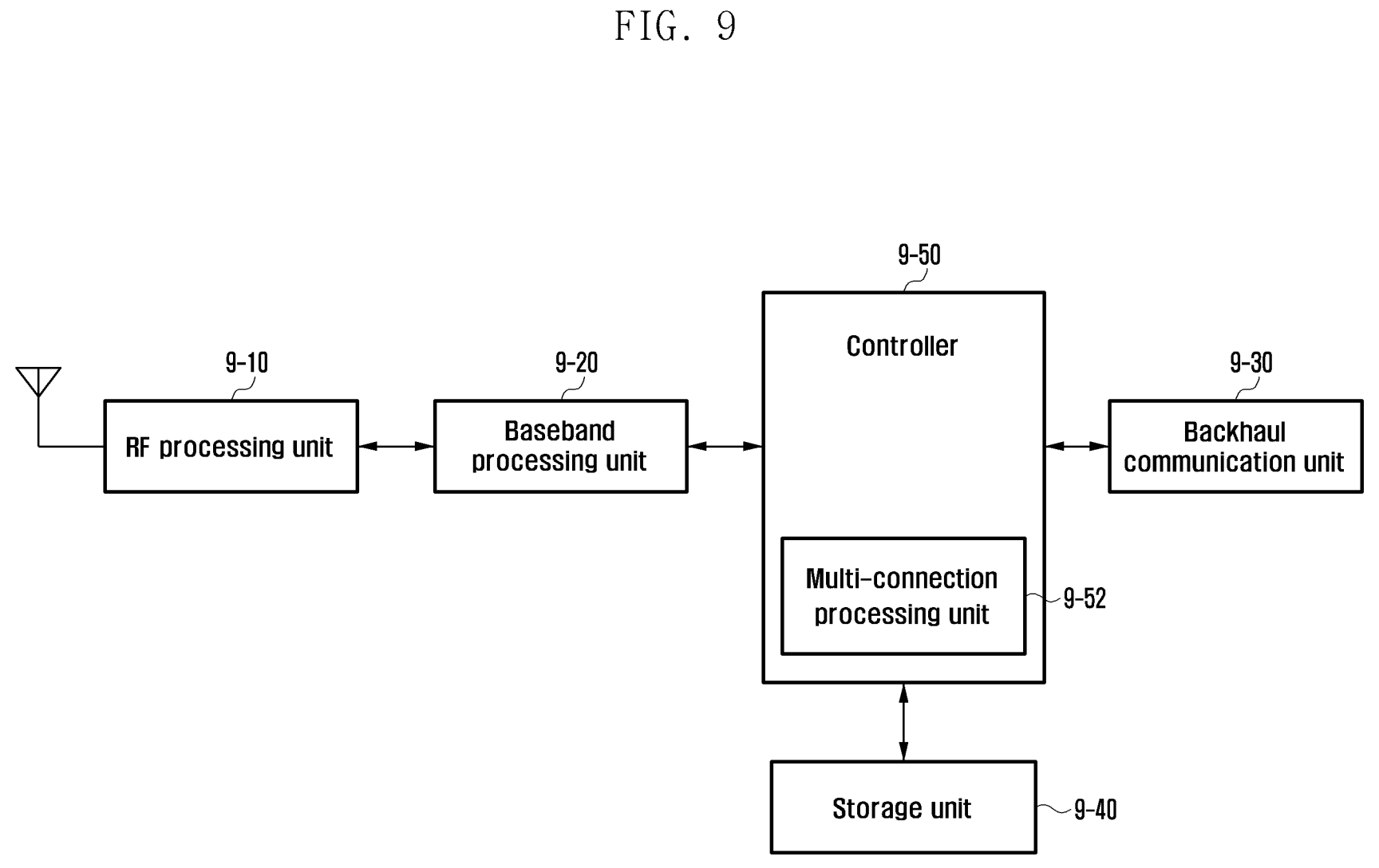

FIG. 9 is a block diagram illustrating a configuration of an LTE eNB or an NR gNB according to an embodiment of the disclosure.

As illustrated in FIG. 9, gNB/eNB includes an RF processing unit 9-10, a baseband processing unit 9-20, a backhaul communication unit 9-30, a storage unit 9-40, and a controller 9-50.

The RF processing unit 9-10 performs a function of transmitting and receiving a signal through a radio channel such as converting or amplifying a band of the signal. That is, the RF processing unit 9-10 up-converts a baseband signal provided from the baseband processing unit 9-20 into an RF band signal, transmits the RF band signal through an antenna, and then down-converts the RF band signal received through the antenna into a baseband signal. For example, the RF processing unit 9-10 may include a transmission filter, a reception filter, an amplifier, a mixer, an oscillator, a DAC, and an ADC. Although FIG. 9 illustrates only one antenna, the first access node may include a plurality of antennas. The RF processing unit 9-10 may include a plurality of RF chains. The RF processing unit 9-10 may perform beamforming. For the beamforming, the RF processing unit 9-10 may control the phase and the size of each of the signals transmitted and received through a plurality of antennas or antenna elements. The RF processing unit may perform a downlink MIMO operation by transmitting one or more layers.

The baseband processing unit 9-20 performs a function of performing conversion between a baseband signal and a bitstream according to a physical-layer standard of the first radio-access technology. For example, in data transmission, the baseband processing unit 9-20 generates complex symbols by encoding and modulating a transmission bitstream. Further, in data reception, the baseband processing unit 9-20 reconstructs a reception bitstream by demodulating and decoding a baseband signal provided from the RF processing unit 9-10. For example, in an OFDM scheme, when data is transmitted, the baseband processing unit 9-20 may generate complex symbols by encoding and modulating the transmission bitstream, map the complex symbols to sub-carriers, and then configure OFDM symbols through an IFFT operation and CP insertion. In addition, in data reception, the baseband processing unit 9-20 divides a baseband signal provided from the RF processing unit 9-10 in units of OFDM symbols, recovers signals mapped with sub-carriers through an FFT operation, and then reconstructs a reception bit string through demodulation and decoding. The baseband processing unit 9-20 and the RF processing unit 9-10 may transmit and receive the signal as described above. Accordingly, each of the baseband processing unit 9-20 and the RF processing unit 9-10 may be referred to as a transmitter, a receiver, a transceiver, a communication unit, or a wireless communication unit.

The backhaul communication unit 9-30 provides an interface for communicating with other nodes within the network. That is, the backhaul communication unit 9-30 converts a bitstream transmitted to another node, for example, the SeNB or a core network from the MeNB, into a physical signal and converts a physical signal received from the other node into the bitstream.

The storage unit 9-40 may store a basic program, an application, configuration information, and the like for the operation of the MeNB. Particularly, the storage unit 9-40 may store information on bearers allocated to the accessed UE, a measurement result reported from the accessed UE, and the like. Further, the storage unit 9-40 may store information which is a reference for determining whether to provide or stop multiple connections to the UE. The storage unit 9-40 provides stored data according to a request from the controller 9-50.

The controller 9-50 controls the overall operation of the MeNB. For example, the controller 9-50 may transmit and receive a signal through the baseband processing unit 9-20 and the RF processing unit 9-10 or through the backhaul communication unit 9-30. Further, the controller 9-50 records data in the storage unit 9-40 and reads the data. To this end, the controller 8-50 may include at least one processor.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, a part of one embodiment of the disclosure may be combined with a part of another embodiment to operate a base station and a terminal. Moreover, the embodiments of the disclosure may be applied to other communication systems, and other variants based on the technical idea of the embodiments may also be implemented. For example, the embodiments may be applied to LTE, 5G, and NR systems. Therefore, the scope of the disclosure should be construed to include, in addition to the embodiments disclosed herein, all changes and modifications derived based on the technical idea of the disclosure.

The invention claimed is:

1. A method performed by a user equipment (UE) in a wireless communication system, the method comprising:

transmitting, to a base station (BS), a UE capability including information indicating that the UE supports reporting of an uplink transmit (Tx) direct current location for an intra-band uplink carrier aggregation (CA);

receiving, from the BS, a radio resource control (RRC) reconfiguration message including information indicating the reporting of the uplink Tx direct current location for the intra-band uplink CA; and as a response to the RRC reconfiguration message, transmitting, to the BS, an RRC reconfiguration complete message including an uplink Tx direct current list for a first bandwidth part (BWP) of a first cell and a second BWP of a second cell, wherein the uplink Tx direct current list includes a single serving cell index to be used as a reference for an uplink Tx direct current location across the first BWP and the second BWP, and the uplink Tx direct current location across the first BWP and the second BWP with respect to the single serving cell index.

2. The method of claim 1, wherein the uplink Tx direct current list further includes a first BWP identifier for the first BWP of the first cell and a second BWP identifier for the second BWP of the second cell.

3. The method of claim 1, wherein the information indicating the reporting of the uplink Tx direct current location is configured in at least one of master cell group information included in the RRC reconfiguration message or secondary cell group information included in the RRC reconfiguration message.

4. A method performed by a base station (BS) in a wireless communication system, the method comprising:

receiving, from a user equipment (UE), a report of a UE capability including information indicating that the UE supports reporting of an uplink transmit (Tx) direct current location for an intra-band uplink carrier aggregation (CA);

transmitting, to the UE, a radio resource control (RRC) reconfiguration message including information indicating the reporting of the uplink Tx direct current location for the intra-band uplink CA; and as a response to the RRC reconfiguration message, receiving, from the UE an RRC reconfiguration complete message including an uplink Tx direct current list for a first bandwidth part (BWP) of a first cell and a second BWP of a second cell, wherein the uplink Tx direct current list includes a single serving cell index to be used as a reference for an uplink Tx direct current location across the first BWP and the second BWP, and the uplink Tx direct current location across the first BWP and the second BWP with respect to the single serving cell index.

5. The method of claim 4, wherein the uplink Tx direct current list further includes a first BWP identifier for the first BWP of the first cell and a second BWP identifier for the second BWP of the second cell.

6. The method of claim 4, wherein the information indicating the reporting of the uplink Tx direct current location is configured in at least one of master cell group information included in the RRC reconfiguration message or secondary cell group information included in the RRC reconfiguration message.

7. A user equipment (UE) in a wireless communication system, the UE comprising:

a transceiver configured to transmit and receive a signal; and a controller connected to the transceiver, wherein the controller is configured to:

transmit, to a base station (BS), a UE capability including information indicating that the UE supports reporting of an uplink transmit (Tx) direct current location for an intra-band uplink carrier aggregation (CA), receive, from the BS, a radio resource control (RRC) reconfiguration message including information indicating the reporting of the uplink Tx direct current location for the intra-band uplink CA, and as a response to the RRC reconfiguration message, transmit, to the BS, an RRC reconfiguration complete message including an uplink Tx direct current list for a first bandwidth part (BWP) of a first cell and a second BWP of a second cell, wherein the uplink Tx direct current list includes a single serving cell index to be used as a reference for an uplink Tx direct current location across the first BWP and the second BWP, and the uplink Tx direct current location across the first BWP and the second BWP with respect to the single serving cell index.

8. The UE of claim 7, wherein the uplink Tx direct current list further includes a first BWP identifier for the first BWP of the first cell and a second BWP identifier for the second BWP of the second cell.

9. The UE of claim 7, wherein information indicating the reporting of the uplink Tx direct current location is configured in at least one of master cell group information included in the RRC reconfiguration message or secondary cell group information included in the RRC reconfiguration message.

10. A base station (BS) in a wireless communication system, the BS comprising:

a transceiver configured to transmit and receive a signal; and a controller connected to the transceiver, wherein the controller is configured to:

receive, from a user equipment (UE), a report of a UE capability including information indicating that the UE supports reporting of an uplink transmit transmit (Tx) direct current location for an intra-band uplink carrier aggregation (CA), transmit, to the UE, a radio resource control (RRC) reconfiguration message including information indicating the reporting of the uplink Tx direct current location for the intra-band uplink CA, and as a response to the RRC reconfiguration message, receive, from the UE, an RRC reconfiguration complete message including an uplink Tx direct current list for a first bandwidth part (BWP) of a first cell and a second BWP of a second cell, wherein the uplink Tx direct current list includes a single serving cell index to be used as a reference for an uplink Tx direct current location across the first BWP and the second BWP, and the uplink Tx direct current location across the first BWP and the second BWP with respect to the single serving cell index.

11. The BS of claim 10, wherein the uplink Tx direct current list further includes a first BWP identifier for the first BWP of the first cell and a second BWP identifier for the second BWP of the second cell.

12. The BS of claim 10, wherein information indicating the reporting of the uplink Tx direct current location is configured in at least one of master cell group information included in the RRC reconfiguration message or secondary cell group information included in the RRC reconfiguration message.

* * * * *